July 29, 1969

J. C. YARROW 3,457,576

RESURFACING MACHINE

Filed June 5, 1967

INVENTOR.
JOHN C. YARROW
BY
EDWARD D. O'BRIAN
ATTORNEY.

July 29, 1969  J. C. YARROW  3,457,576
RESURFACING MACHINE
Filed June 5, 1967 2 Sheets-Sheet 2
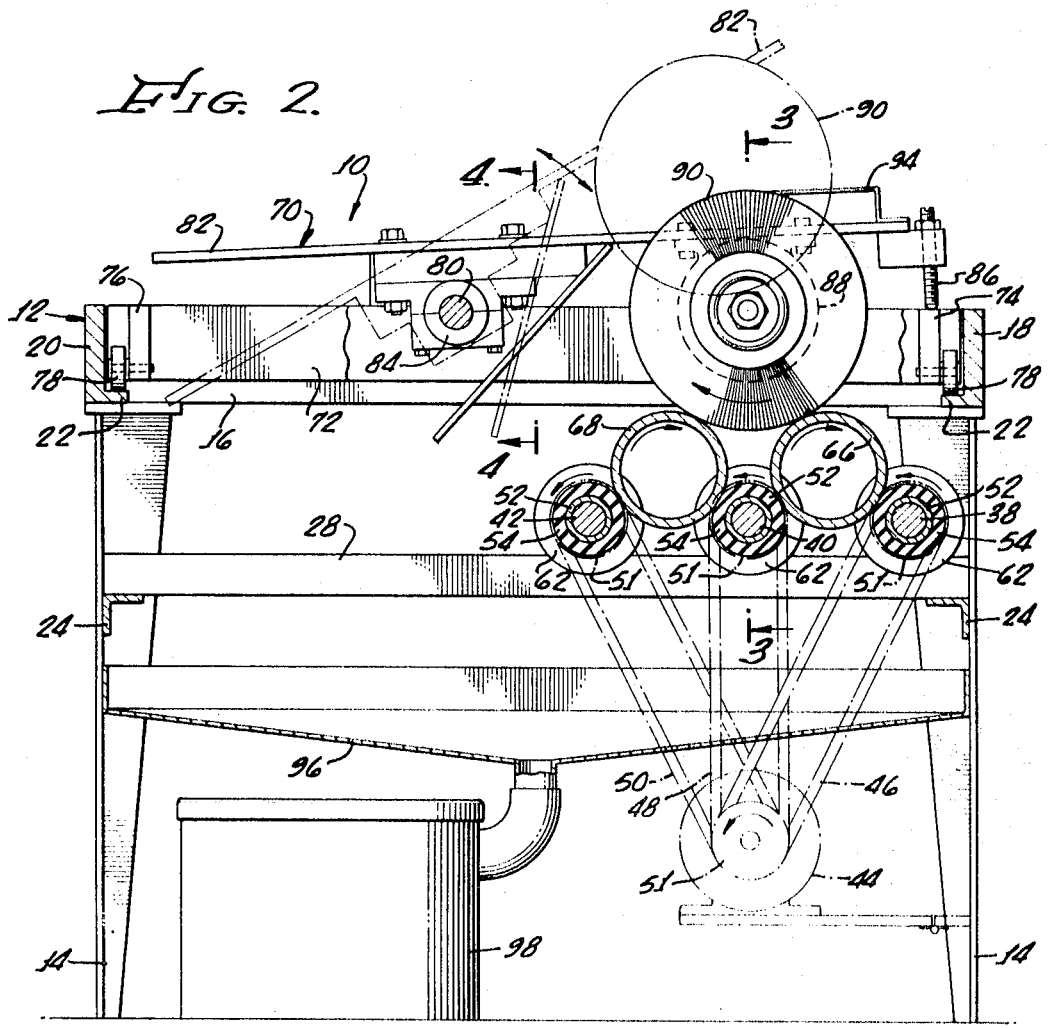
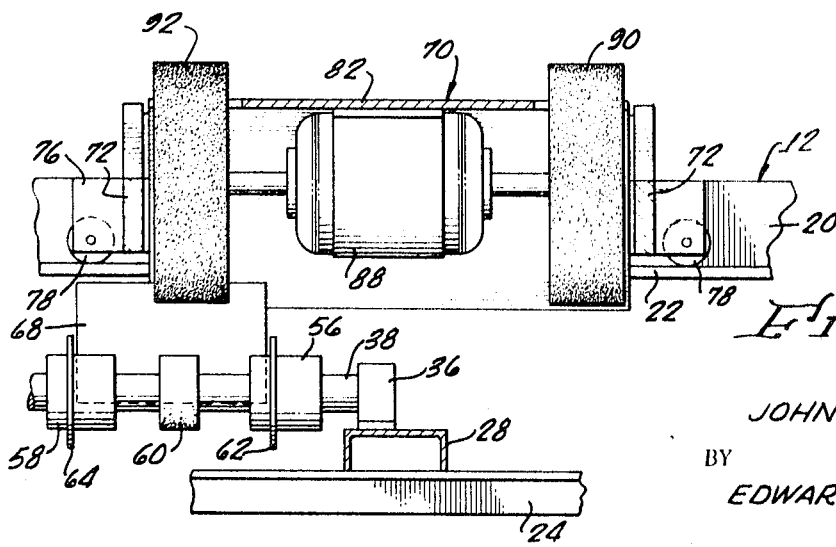
INVENTOR.
JOHN C. YARROW
BY
EDWARD D. O'BRIAN
ATTORNEY.

United States Patent Office 3,457,576
Patented July 29, 1969

3,457,576
RESURFACING MACHINE
John C. Yarrow, 1310–12 S. Hill St.,
Los Angeles, Calif. 90015
Filed June 5, 1967, Ser. No. 643,557
Int. Cl. A46b 13/02; A471 11/00
U.S. Cl. 15—21      3 Claims

ABSTRACT OF THE DISCLOSURE

The resurfacing machine has three parallel shafts which carry drive rollers and spacer discs. The shafts preferably lie in a single plane and are driven to rotate at a constant, slow speed. The rollers are spaced to permit protuberances on the workpieces to swing between the rollers. Th discs are spaced to axially locate the workpieces. An axially movable carriage carries a pivotal mounting plate. A drive motor and refinishing wheel are mounted on the mounting plate. The refinishing wheel is rotated by the motor and is located so that as the mounting plate is swung down, the wheel touches and refinishes the workpieces mounted in two rows on the three shafts. As the carriage is axially moved, the workpieces are refinished along their length.

This invention is directed to a resurfacing machine. The resurfacing machine of this invention is arranged for work holding and work rotating and is arranged for traverse of the rotating flexible resurfacing wheels over the work. The machine of this invention is particularly adapted for the refinishing of cylindrical work pieces, especially when a large quantity of such work pieces need to be brushed. Furthermore, it is especially adapted for the refinishing of the field housings of electric generators and starter motors, such as are used in automotive vehicles.

Many cylindrical items need to be refinished. However, the need for refinishing becomes especially important in those operations wherein a clean surface is desired or required. In the field of refinishing automotive electric starters and generators, equipment suitable for the rapid, inexpensive brushing of the exteriors of field housings has been almost non-existent. In the past, methods of cleaning the exteriors of these housings have generally included either expensive hand operations and have tended to be time consuming and expensive. Thus, it is considered that nothing has been available in the past which is able to satisfactorily accomplish the operations which the brushing machine of this invention admirably accomplishes. Thus, the need has been there, but has been unfulfilled in the past.

SUMMARY

In order to aid in the understanding of this invention, it can be stated in essentially summary form that it is directed to a resurfacing machine. The resurfacing machine has three parallel work supporting shafts, which may lie in a single plane. The work supporting shafts carry rollers on them for supporting and driving the work. The work supporting shafts are connected so that they rotate at a substantially constant, slow speed. A carriage is mounted to be axially movable with respect to the shafts. The carriage carries a refinishing wheel positioned so that it can come in contact with and refinish workpieces resting next to each other on the workpiece supporting shafts. Axial motion of the carriage permits the refinishing wheel to move in an axial direction with respect to the shafts along the workpieces.

Accordingly, it is an object of this invention to provide a brushing machine which is capable of economically and quickly brushing the exteriors of cylindrical bodies so as to clean the surfaces thereof. It is another object of this invention to provide a brushing machine which is particularly adapted to the brushing of the external surfaces of automottive electrical generators and starters so that they can be rebuilt quickly and economically. It is a further object of this invention to provide a brushing machine which rotates a cylindrical object and traverses a rotating brush along the length of the surfaces of the rotating object.

It is a further object of this invention to provide a brushing machine which can support a plurality of cylindrical work pieces in end-to-end or adjacent to-each-other position, and to provide a rotating brush upon a carriage, which brush can be traversed along the length of the work pieces so as to brush them as they rotate. It is another object of this invention to provide a brushing machine which is capable of economically brushing a large number of work pieces with a minimum of labor and as quickly as possible; and to provide a machine which is economic of construction and is of low maintenance. Other objects and advantages of this invention will become apparent from a study of the following portions of this specification, the appended claims and the attached drawings.

BRIEF DESCRIPTION OF THE DRAWINGS

FIG. 2 is an enlarged sectional view taken generally along the line 2—2 of FIG. 1.

FIG. 3 is a partial sectional view taken along the line 3—3 of FIG. 2; and

DESCRIPTION

Figure 1:
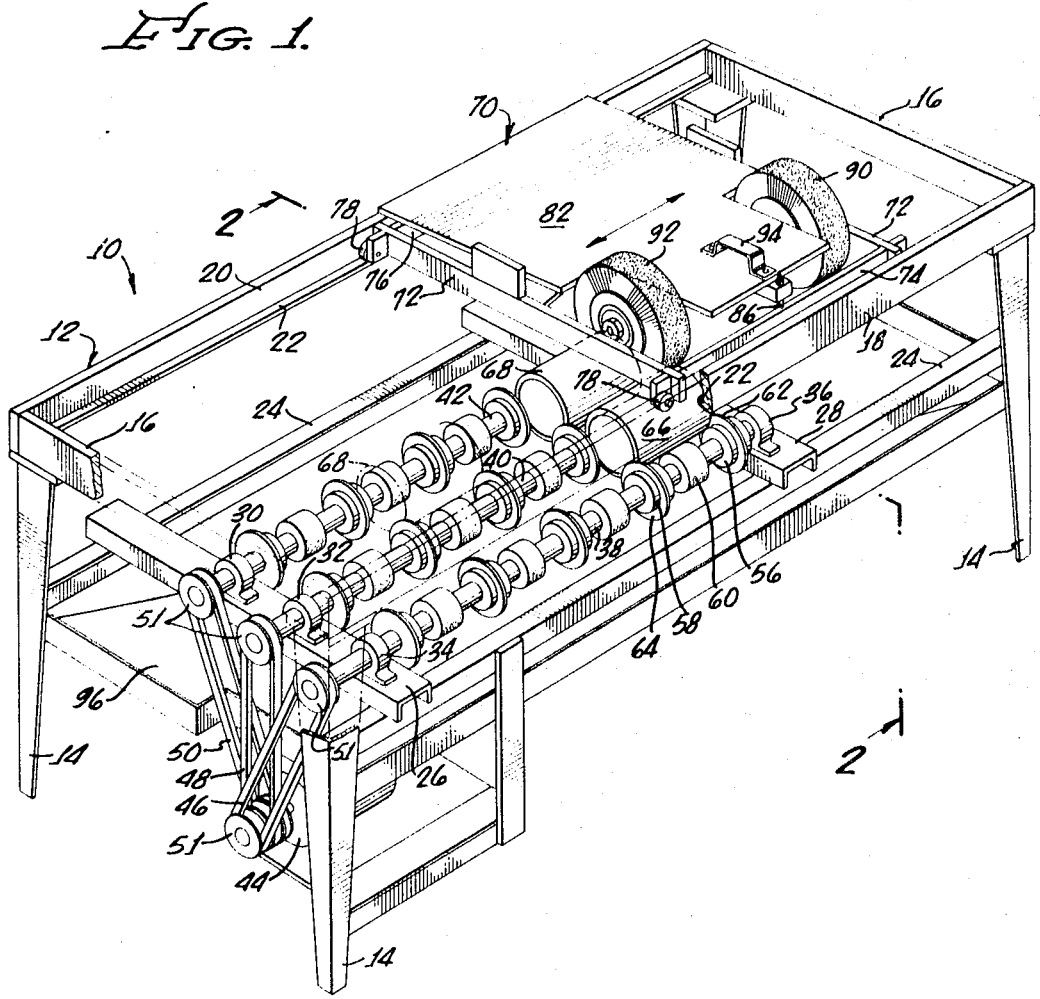
FIG. 1 is an isometric view, with parts broken away, showing a brushing machine of this invention.
Figure 4:
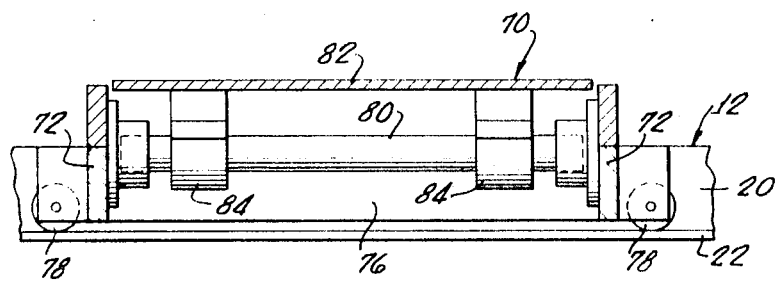
FIG. 4 is a partial sectional view taken generally along the line 4—4 of FIG. 2.

Referring now to the drawings, the brushing machine of this invention is generally indicated at 10. The brushing machine comprises a frame 12. Frame 12 is supported on the legs 14 and have cross rails 16 as well as front rail 18 and rear rail 20. The rails 18 and 20 are each L-shaped so as to have an upright member and an inwardly extending rack 22.

Below the rails 16, 18 and 20 of the frame 12 are mounted longitudinal support bars 24. Mounted across the support bars 24 are bearing supports 26 and 28. Three bearings 30, 32 and 34 are mounted upon bearing support 26. Three similar bearings are mounted upon the bearing support 28. One of these bearings 36 is seen in FIG. 1, the others are not shown. These bearings 30, 32, 34, 36 (and those not shown) are arranged so as to rotatably support shafts 38, 40 and 42. These shafts 38, 40 and 42 are parallel to each other and are parallel to front and rear rails 18 and 20.

A motor 44 is mounted below the shafts 38, 40 and 42 and is connected to them so as to drive them by means of belts 46, 48 and 50, respectively. Suitable belt sheaves 51 are used upon the motor and upon the shafts. The motor is preferably of a gearhead variety, or otherwise has relatively slowly rotating output shaft so that the shafts are rotated at a relatively slow speed. Rotation of shafts 38, 40 and 42 in the order of 60 to 100 r.p.m. is deemed adequate for proper brushing. Instead of the motor 44, since the shafts are driven by engagement of the brushes upon the work pieces, and the work pieces in turn engage with the shafts 38, 40 and 42, so as to drive them, a governor operated brake (not shown) can be used. However, a motor is preferred since it is considered more reliable since it imparts constant rotative speed to the work pieces, even at the beginning of brushing. When adequate driving engagement can be obtained between the work piece and one roller shaft, only the center shaft 40 need be controlled in speed. The outer shafts can be idlers.

The shafts 38, 40 and 42 carry end rollers 56 and 58 and center rollers 60 which support, drive and position work pieces. A number of the rollers are shown in FIG. 1, and several are shown in large detail in FIGS. 2 and 3. Referring to FIG. 3, end rollers 56 and 58 are shown therein; spaced from them is center roller 60. A plurality of such rollers are carried on each of the shafts 38, 40 and 42, spaced along the lengths of the shafts. Each of the rollers 56, 58 and 60 has a rigid tubular center 52 and a rubber or other related resilient cover 54, as shown in FIG. 2. Relatively hard rubber is preferred for cover 54, for its long wear life and for its high coefficient of friction in driving the work pieces.

The end rollers 56 and 58 are in reality a pair of rollers spaced by separator discs 62 and 64, respectively. These separators discs are preferably covered with nylon or some other wear-resistant, slippery polymer composition material. They serve to space the work pieces. It should be noted that the separator discs 62 and 64 are off center with respect to the center points of end rollers 56 and 58. This is to provide the proper positioning of the space between the rollers so that the terminals on the work pieces can pass between the rollers.

From this construction it can be seen that a plurality of work pieces 68 can be axially spaced along the length of shafts 40 and 42, and supported by the rollers 56, 58 and 60 thereon. The separating discs 62 and 64 are provided so as to prevent endwise contact of the work pieces and so as to maintain the external terminals in the work pieces in the spaces between the rollers 56 and 58. This spacing is necessary, for the work pieces 66 and 68 are preferably the field housings of automotive electric generators and starters which are in the process of reconditioning.

In those cases where a refinishing machine of less productivity is required, only a pair of shafts need be used. Indeed, in those cases where only one work piece is to be refinished at a time, only one work piece space need be provided. In the case of work pieces other than field housings, the rollers and spacers may be appropriately arranged to accept, support and rotate the particular work piece. In those cases where the work piece does not have protruding points, like the terminals on field housings, spaced rollers are not necessary.

The carriage 70 which carries the brushes is generally indicated at 70. Carriage 70 comprises a rectangular frame having a side rail 72, a front rail 74 and a rear rail 76. The front and rear rails 74 and 76 each carry a pair of rollers 78 which engage upon the tracks 22. Thus the carriage 70 is traversable along the length of the tracks. The side rails 72 carry a mounting shaft 80 which extends between them. A mounting plate 82 carries bearings 84 on its underside. These bearings 84 engage the shaft 80 so that mounting plate 82 is tiltable with respect to the previously described parts of the carriage 70. An adjustable stop 86 on the plate 82 engages upon the front rail 74 so as to limit the downward motion of the front of mounting plate 82. The mounting plate 82 swings from a downward limited position shown in solid lines in FIG. 2 to an upper raised position which is shown in dotted lines in FIG. 2.

Mounted upon the underside of mounting plate 82 and generally above the shaft 40 is a brush motor 88. This motor 88 is a double shaft motor and carries brushes 90 and 92 on its shafts. These brushes 90 and 92 are positioned so that they engage both work pieces 66 and 68. Both the brushes 90 and 92 are of suitable stiffness for the kind of work to be accomplished, and in the present case of refinishing the field housings of automotive electric starters and generators, they are preferably wire brushes capable of removing all loose material from the exteriors of these cases to permit refinishing thereof. As is seen in FIG. 2, adjustable stop 86 limits the downward travel of the mounting plate so as to define the engagement of the brushes with the work pieces. A handle 94 on the plate 82 permits raising of the mounting plate. By placing a plurality of work pieces upon the rollers and hand traversing the carriage, a plurality of work pieces may be brushed.

Brushes have been referred to as being the preferred refiinishing wheels. Wire brushes are the most universal type of such wheels, but it is clear that for some work pieces other flexible wheels may be superior. However, in accordance with the structural design of the refinishing machine of this invention, flexible refinishing wheels are necessary. Rigid wheels are considered to be out of the scope of this invention.

In some cases, particularly for short work pieces and low production machines, traverse of the carriage may not be necessary. The brush can be sufficiently wide to cover the entire length of the work piece without traverse, and thus, in this specialized circumstance, a simpler construction can result.

In order to catch the material brushed off the work pieces, a deflector plate 94 is mounted beneath mounting plate 82. Further, a vacuum pan 96 is mounted between the legs 14 in such a position as to catch the brushed off material. The vacuum pan 96 is connected to vacuum cleaner mechanism 98 which draws off the material and collects it.

This invention having been described in its preferred embodiment, it is clear that it is susceptible to numerous modifications and embodiments within the scope of this invention and without the exercise of the inventive faculty. Accordingly, the scope of this invention is defined by the scope of the following claims.

1. A resurfacing machine, said resurfacing machine comprising:

a frame, work holder structure mounted on said frame, the improvement comprising:

said work holder structure comprising first, second and third shafts rotatably mounted upon said frame, said shafts having axes, said axes of said first, second and third shafts being substantially parallel and lying in a substantially horizontal plane, speed control means connected to said shafts so that said shafts are rotatable at a substantially constant speed, rollers mounted upon said shafts, said rollers being adapted to support first and second workpieces thereon with said first workpiece supported on said rollers on said first and second shafts and said second workpiece supported on said rollers on said second and third shafts so that when said shafts are rotated, said first and second workpieces are rotated;

first and second rails mounted on said frame, said first and second rails being positioned substantailly parallel to said shaft axes, a carriage mounted on said rails so that said carriage is movable substantially axially of said shafts, a refinishing wheel mounted on said carriage, said refinishing wheel being rotatable with respect to said carriage, drive means connected to said refinishing wheel to rotate said refinishing wheel, said refinishing wheel being flexible and being movable into a position where it is in contact with both first and second workpieces supported on said rollers so that as said refinishing wheel is rotated and the workpieces are rotated, and as said carriage is moved along its rails, said refinishing wheel refinishes the first and second workpieces around their circumference and along their length.

2. The resurfacing machine of claim 1 wherein there are a plurality of spaced rollers mounted along said shafts, said rollers being so spaced as to accept therebetween external protrusions on the workpieces being refinished, and wherein there are a plurality of spacer discs positioned along at least one of said shafts so that a plurality of workpieces can be longitudinally placed along said shafts and longitudinally spaced from each other.

3. The resurfacing machine of claim 2 wherein said carriage has a mounting plate thereon, said mounting plate being pivotally mounted on said carriage on an axis substantially parallel to the axes of said first, second and third shafts, said refinishing wheel being rotatably mounted on said mounting plate on an axis substantially parallel to the axes of said first, second and third shafts, and said drive means for said refinishing wheel being mounted on said mounting plate so that said refinishing wheel can be moved toward said first, second and third shafts in a direction substantially perpendicular to a plane through said first and third shafts to move the refinishing wheel into refinishing position with respect to the first and second workpieces mounted on said shafts.

References Cited

UNITED STATES PATENTS

| | | | |
|---|---|---|---|
| 2,664,580 | 1/1954 | Feeser | 15—88 X |
| 2,690,577 | 10/1964 | Coninx | 15—88 X |
| 2,751,617 | 6/1956 | McLaggan | 15—88 |
| 2,979,196 | 4/1961 | Harmon | 15—88 X |
| 3,210,788 | 10/1965 | Holliday | 15—88 |
| 3,218,658 | 11/1965 | Collins et al. | 15—104.04 X |

EDWARD L. ROBERTS, Primary Examiner

U.S. Cl. X.R.

15—88; 51—48